(12) United States Patent
Fein et al.

(10) Patent No.: US 7,844,695 B2
(45) Date of Patent: *Nov. 30, 2010

(54) DATA FORWARDING STORAGE

(76) Inventors: Gene Fein, 29712 Zuma Bay Way, Malibu, CA (US) 90265; Edward Merritt, 139 Lime Kiln Rd., Lenox, MA (US) 01240

( * ) Notice: Subject to any disclaimer, the term of this patent is extended or adjusted under 35 U.S.C. 154(b) by 239 days.

This patent is subject to a terminal disclaimer.

(21) Appl. No.: 12/240,802

(22) Filed: Sep. 29, 2008

(65) Prior Publication Data

US 2009/0234933 A1    Sep. 17, 2009

Related U.S. Application Data

(63) Continuation of application No. 12/046,757, filed on Mar. 12, 2008, now Pat. No. 7,430,584.

(51) Int. Cl.
*G06F 15/173* (2006.01)
(52) U.S. Cl. .................. 709/223; 709/212; 709/216; 709/224; 370/351; 370/401
(58) Field of Classification Search ............... 709/212, 709/216, 233, 224, 229, 223, 249, 236; 370/351, 370/401
See application file for complete search history.

(56) References Cited

U.S. PATENT DOCUMENTS

| | | | |
|---|---|---|---|
| 5,787,258 A | 7/1998 | Costa et al. | |
| 6,151,395 A | 11/2000 | Harkins | |
| 6,260,159 B1 * | 7/2001 | Garnett et al. | 714/15 |
| 6,505,213 B1 * | 1/2003 | Kamada et al. | 1/1 |
| 6,684,258 B1 | 1/2004 | Gavin et al. | |
| 6,745,289 B2 * | 6/2004 | Gruner et al. | 711/119 |
| 6,985,476 B1 | 1/2006 | Elliott et al. | |
| 7,061,923 B2 | 6/2006 | Dugan et al. | |
| 7,103,824 B2 | 9/2006 | Halford | |
| 7,120,631 B1 | 10/2006 | Vahalia et al. | |
| 7,143,170 B2 | 11/2006 | Swildens et al. | |
| 7,191,298 B2 | 3/2007 | Kaminsky et al. | |

(Continued)

FOREIGN PATENT DOCUMENTS

EP    1 048 998    11/2000

(Continued)

OTHER PUBLICATIONS

Tsutomu Akasaka, "Remote Copy Technology of ETERNUS6000 and ETERNUS3000 Disk Arrays," Fujitsu Sci. Tech. J., 42.1, pp. 9-16, Jan. 2006.

(Continued)

*Primary Examiner*—Lashonda T Jacobs
(74) *Attorney, Agent, or Firm*—Knobbe Martens Olson & Bear, LLP

(57) ABSTRACT

Methods and apparatus, including computer program products, for data forwarding storage. A network includes a group of interconnected computer system nodes each adapted to receive data and continuously forward the data from computer memory to computer memory without storing on any physical storage device in response to a request to store data from a requesting system and retrieve data being continuously forwarded from computer memory to computer memory in response to a request to retrieve data from the requesting system.

21 Claims, 5 Drawing Sheets

U.S. PATENT DOCUMENTS

| | | | |
|---|---|---|---|
| 7,277,941 | B2 | 10/2007 | Ignatius et al. |
| 7,327,731 | B1 | 2/2008 | Kumar et al. |
| 7,404,002 | B1 | 7/2008 | Pereira |
| 7,430,584 | B1 | 9/2008 | Fein et al. |
| 7,631,052 | B2 | 12/2009 | Fein et al. |
| 2002/0194371 | A1 | 12/2002 | Kadoi |
| 2003/0158958 | A1 | 8/2003 | Chiu |
| 2004/0064633 | A1 | 4/2004 | Oota |
| 2004/0223503 | A1 | 11/2004 | Lynch et al. |
| 2004/0250029 | A1 | 12/2004 | Ji et al. |
| 2005/0044162 | A1 | 2/2005 | Liang et al. |
| 2005/0201409 | A1 | 9/2005 | Griswold et al. |
| 2005/0243823 | A1 | 11/2005 | Griswold et al. |
| 2006/0031593 | A1 | 2/2006 | Sinclair |
| 2006/0090017 | A1* | 4/2006 | Kim et al. .................. 710/22 |
| 2006/0143505 | A1 | 6/2006 | Olarig |
| 2006/0242212 | A1 | 10/2006 | Brinkmann et al. |
| 2007/0055765 | A1 | 3/2007 | Lisiecki et al. |
| 2007/0073965 | A1* | 3/2007 | Rajakarunanayake ....... 711/112 |
| 2007/0186068 | A1 | 8/2007 | Agrawal |
| 2007/0195772 | A1 | 8/2007 | Shadish |
| 2008/0013448 | A1* | 1/2008 | Horie et al. ................ 370/229 |
| 2008/0037777 | A1 | 2/2008 | Ignatius et al. |
| 2008/0059495 | A1 | 3/2008 | Kiessig et al. |
| 2008/0071855 | A1 | 3/2008 | Farber et al. |
| 2009/0006808 | A1 | 1/2009 | Blumrich et al. |
| 2009/0067322 | A1 | 3/2009 | Shand et al. |
| 2009/0141621 | A1 | 6/2009 | Fan et al. |
| 2009/0238167 | A1 | 9/2009 | Fein et al. |
| 2009/0254567 | A1 | 10/2009 | Fein et al. |

FOREIGN PATENT DOCUMENTS

| | | |
|---|---|---|
| EP | 1 357 476 A | 10/2003 |
| EP | 1406446 A1 | 4/2004 |
| EP | 1322068 B1 | 11/2006 |
| EP | 1798934 A1 | 6/2007 |
| EP | 1798937 A1 | 6/2007 |
| EP | 1826968 A1 | 8/2007 |
| EP | 1485787 B1 | 10/2007 |
| EP | 1776639 B1 | 12/2007 |
| EP | 1479236 B1 | 1/2008 |
| JP | 2002-268952 | 9/2002 |
| WO | WO 02/052417 | 7/2002 |
| WO | WO 2006/124217 | 11/2006 |
| WO | WO 2009/117259 | 9/2009 |
| WO | WO 2009/126418 | 10/2009 |

OTHER PUBLICATIONS

Cheeha Kim, "An Efficient Multicast Data Forwarding Scheme For Mobile Ad Hoc Networks," Information Networking, Convergence in Broadband and Mobile Networking, International Conference, ICOIN 2005.

Ertaul et. al., "Implementation of Homomorphic Encryption Schemes For Secure Packet Forwarding in Mobile Ad Hoc Networks (MANETS)," IJCSNS, vol. 7, No. 11, pp. 132-141, Nov. 2007.

Ertaul et. al., "ECC Based Threshold Cryptography for Secure Data Forwarding and Secure Key Exchange in MANET (I)," NETWORKING 2005, LNCS 3462, pp. 102-113, 2005.

Huang et. al., "Secure Data Forwarding in Wireless Ad Hoc Networks," IEEE International Conference, pp. 3525-3531, 2005.

Ito, et al., "Technologies of ETERNUSVS900 Storage Virtualization Switch," Fujitsu Sci. Tech. J., 42.1 pp. 17-23, Jan. 2006.

Komandur et. al., "SPAM: A Data Forwarding Model for Multipoint-to-Multipoint Connection Support in ATM Networks," $IC^3N$, IEEE Computer Society, pp. 1-7, Sep. 1997.

Lusheng Ji et. al., "On Providing Secure and Portable Wireless Data Networking Services: Architecture and Data Forwarding Mechanisms," IPSJ Journal, vol. 45, No. 10, pp. 2261-2269, Oct. 2004.

International Search Report and Written Opinion, PCT/US2009/036171, dated Sep. 4, 2009 in 13 pgs.

International Search Report and Written Opinion, PCT/US2009/037579, dated Jun. 24, 2009, 11 pages.

Non-Final Office Action mailed Apr. 6, 2010, re U.S. Appl. No. 12/099,498.

Notice of Allowance mailed Aug. 7, 2008, re U.S. Appl. No. 12/046,757.

Non-Final Office Action mailed May 14, 2009, re U.S. Appl. No. 12/132,804.

Notice of Allowance mailed Jul. 15, 2009, re U.S. Appl. No. 12/132,804.

\* cited by examiner

DATA FORWARDING STORAGE

CROSS-REFERENCE TO RELATED APPLICATIONS

This application is a continuation of U.S. application Ser. No. 12/046,757 filed Mar. 12, 2008 now U.S. Pat. No. 7,430,584, which is herein incorporated by reference in its entirety.

BACKGROUND

At least some embodiments disclosed herein relate to data storage, and more particularly, to data forwarding storage.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for data forwarding storage.

In general, in one aspect, the invention features a method including, in a network of interconnected computer system nodes, receiving a request from a source system to store data, directing the data to a computer memory, and continuously forwarding the data from one computer memory to another computer memory in the network of interconnected computer system nodes without storing on any physical storage device in the network.

In another aspect, the invention features a network including a group of interconnected computer system nodes each adapted to receive data and continuously forward the data from computer memory to computer memory without storing on any physical storage device in response to a request to store data from a requesting system and retrieve data being continuously forwarded from computer memory to computer memory in response to a request to retrieve data from the requesting system.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGS. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous data forwarding system, i.e., data is stored by continually forwarding it from one node memory to another node memory.

Figure 1:
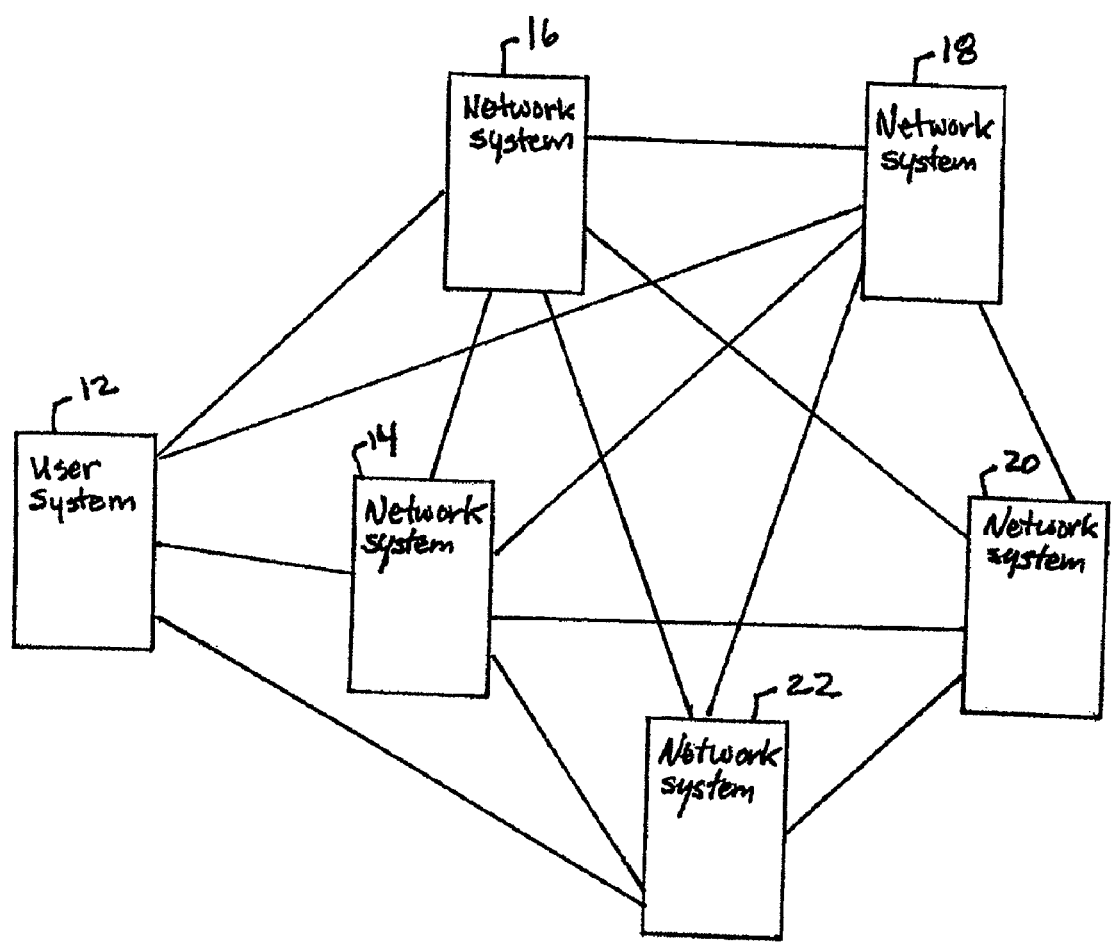
FIG. 1 is a block diagram of an exemplary network.

As shown in FIG. 1, an exemplary network 10 includes a user system 12 and a number of network systems 14, 16, 18, 20, 22. Each of the network systems 14, 16, 18, 20, 22 can be considered to be a node in the network 10 and one such network system may be designated as a central server, such as network system 14, which may assume a control position in network 10. Each of the nodes 14, 16, 18, 20, 22 may be established as a privately controlled network of peers under direct control of the central server 14. Peered nodes may also be a mix of private and public nodes, and thus not under the direct physical control of the central server 14. The network 10 may also be wholly public where the central server 14 (or servers) has no direct ownership or direct physical control of any of the peered nodes.

Figure 2:
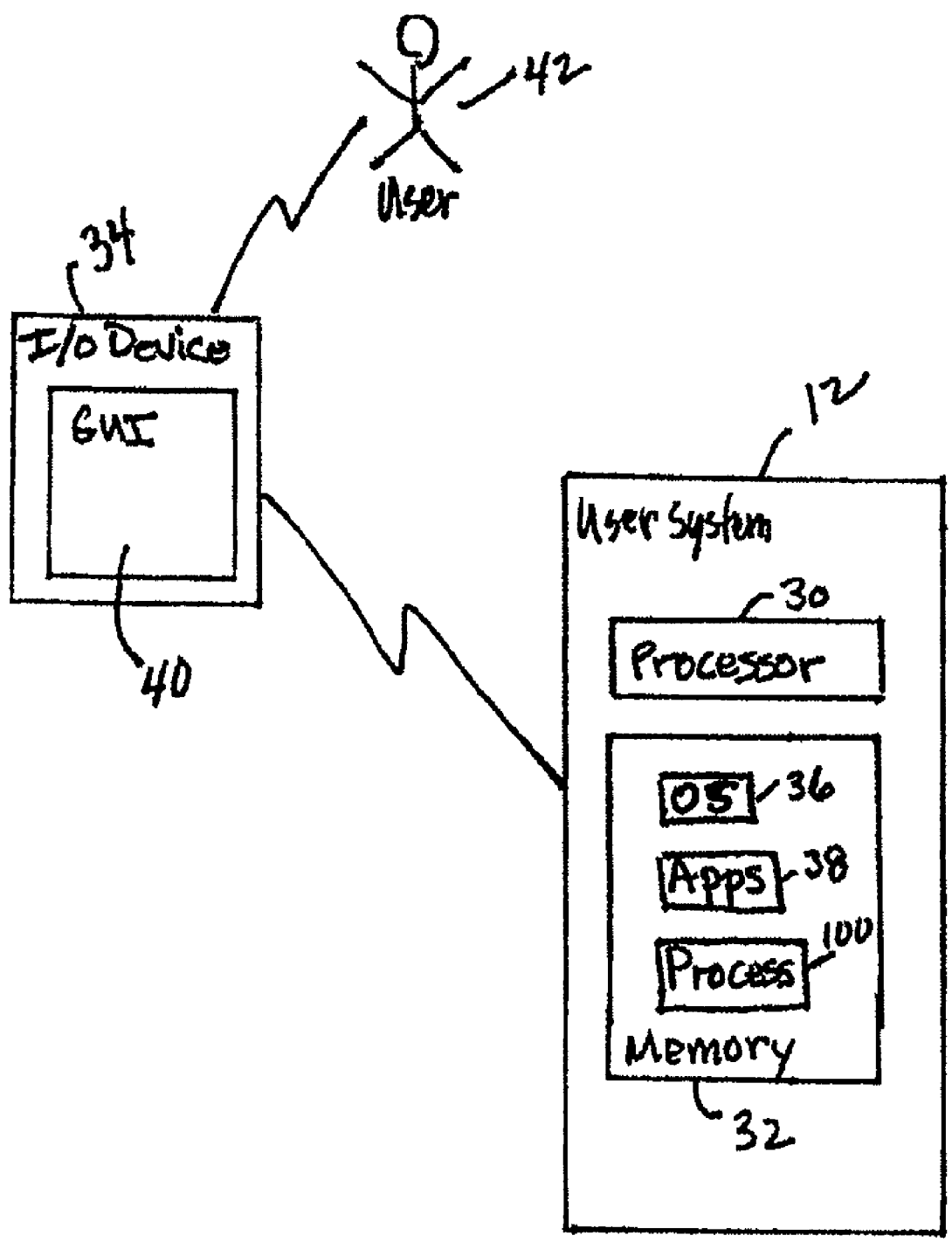
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
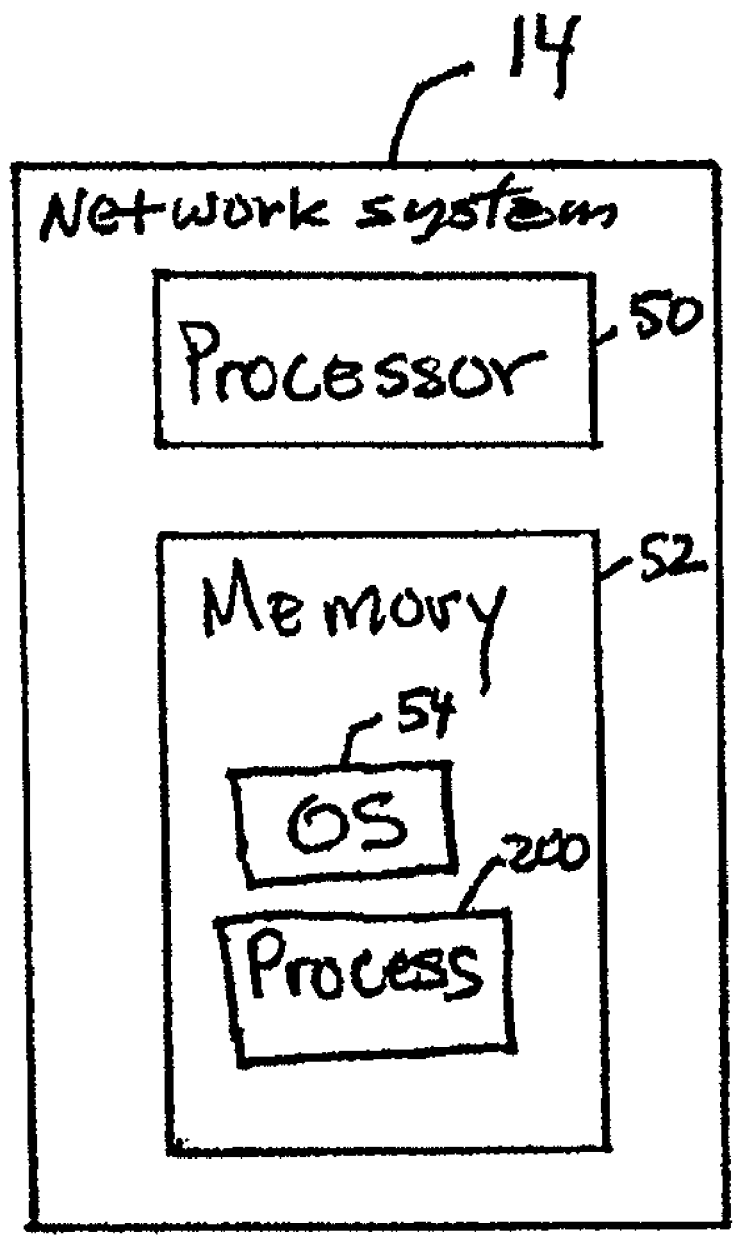
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below.

In traditional systems, application processes 38 need to store and retrieve data. In these traditional systems, data is stored on local or remote physical devices. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data. When a request to store data is received by the central server 14 from storage process 100, data is directed to a node in the network 10 where it is then continuously forwarded from node memory to node memory in the network 10 by the data forwarding process 200 in each of the network nodes without storing on any physical storage medium such as a disk drive. The forwarded data resides only for a very brief period of time in the memory of any one node in the network 10. Data is not stored on any physical storage medium in any network node.

In a like manner, when a request to retrieve data is received by the central server 14 from storage process 100, the requested data, which is being forwarded from node memory to node memory in the network 10, is retrieved.

Data forwarded in this manner can be segmented and segments forwarded as described above. Sill, the segmented data is not stored on any physical storage medium in any network node, but merely forwarded from the memory of one node to the memory of another node.

Figure 4:
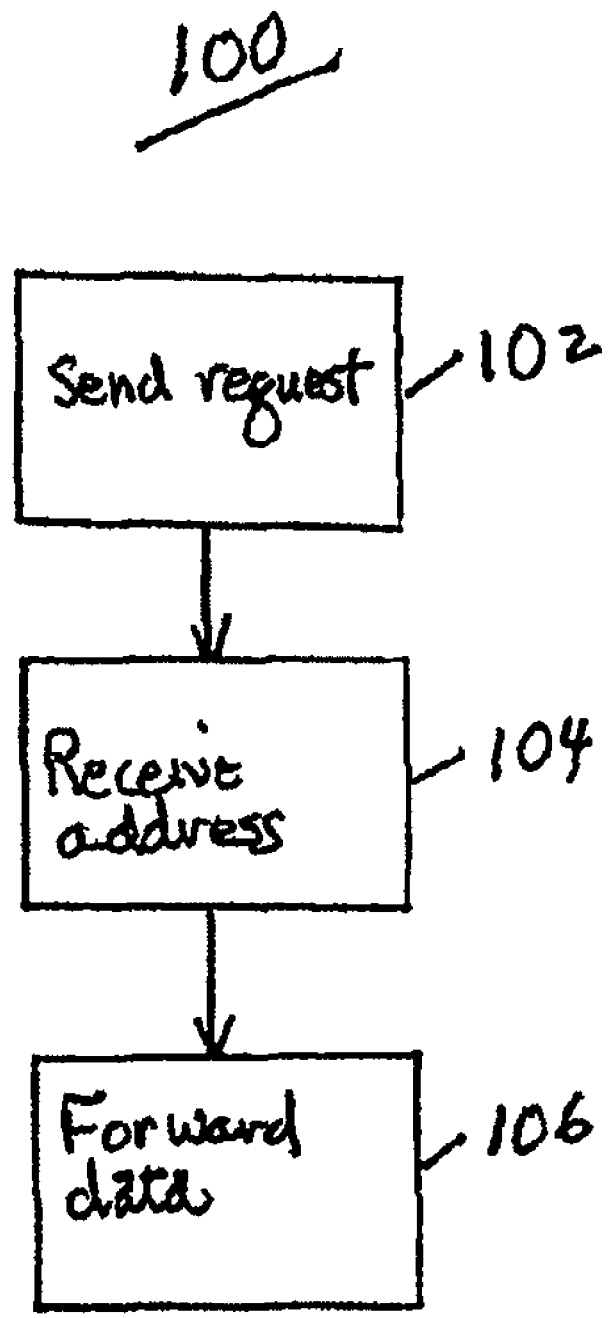
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) an address of a node from the central server 14 and forwards (106) the data to the node memory represented by the received address.

Figure 5:
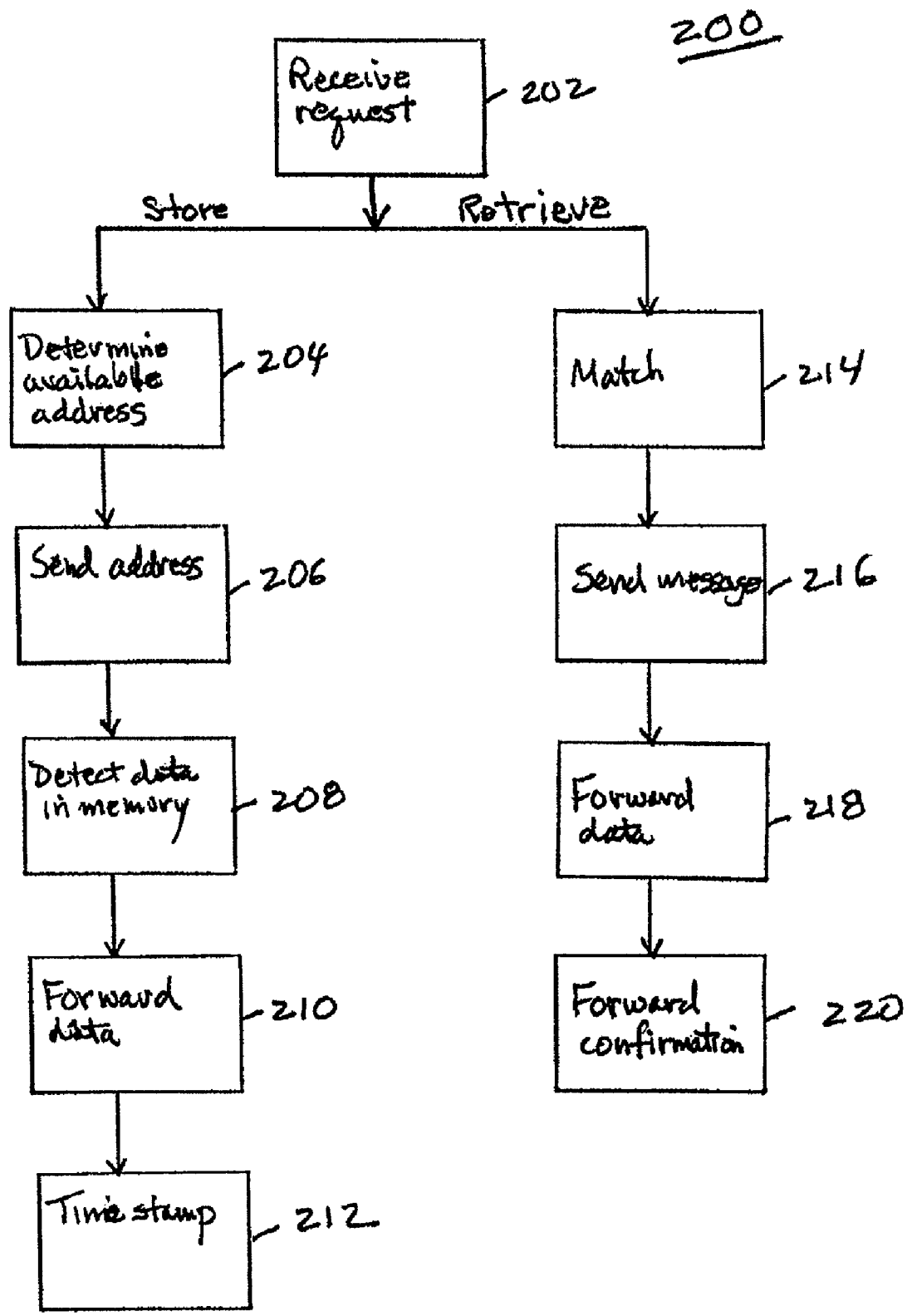
FIG. 5 is a flow diagram of a process.

As shown in FIG. 5, data forwarding process 200 includes receiving (202) a request to store or retrieve data. If the received request is a request to store data, data forwarding process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrives in any node memory, process 200 affixes (212) a time stamp to the data.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data the user's application functions to automatically ping the central server 14 that the data requested has been received. Thus the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature.

The invention can be implemented to realize one or more of the following advantages. A network creates data storage without caching or downloads. Data storage and management are accomplished via a constant routing of the data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computerized method of storing a file in a network of computing devices, the method comprising:
    receiving a request for storage of a data file from a source system, wherein the source system is not part of the network of computing devices;
    receiving the data file;
    directing the data file to a computer memory of a computing device of the network of computing devices, wherein each of the computing devices comprises a computer memory including one or more of a read only memory or a random access memory; and
    periodically selecting a computing device of the network of computing devices that is not the computing device that currently stores the data file and transmitting the data file from the computer memory of the computing device that currently stores the data file to the computer memory of the selected computing device without storing the data file on any physical storage device of the computing devices in the network, wherein physical storage devices include hard disks, magnetic disks, magneto optical disks, and optical disks.

2. The computerized method of claim 1, wherein the data file is encrypted.

3. The computerized method of claim 1, wherein the data file is encrypted prior to each transmitting of the data file to a selected computing device, wherein only the selected computing device of the network of computing devices is configured to decrypt the encrypted data file.

4. The computerized method of claim 1, wherein the periodically selecting comprises:
    pinging one or more of the computing devices in the network of computing devices; and
    in response to receiving a response from a particular computing device, selecting the particular computing device for receiving the data file.

5. The computerized method of claim 1, wherein the periodically selecting is based on one or more of network traffic between at least some of the computing devices and an available memory of at least some of the computing devices.

6. The computerized method of claim 1, further comprising:
    coupling a new computing device to the network of computing devices so that the new computing device is periodically selected for storage of the data file in a computer memory of the new computing device.

7. A computing device for coordinating transfer of a data file between memories of a plurality of computing devices in communication via at least one network, the computing device comprising:
    a network interface providing a communication link with the at least one network that is in communication with the plurality of computing devices and with a source computing device;
    at least one processor configured to cause the computing device to:
        receive a request from the source computing device to store a data file;
        select a computing device of the plurality of computing devices to store the data file in a computer memory of the selected computing device;
        initiate transmission of the data file to the selected computing device, wherein the data file is stored on the computer memory of the selected computing device and not on a physical storage device of the selected computing device; and
        periodically repeat the selecting and initiating so that the data file is periodically transmitted between computer memories of the computing devices without being stored on a physical storage device of the plurality of computing devices.

8. The computing device of claim 7, wherein the source computing device is not coupled to the at least one network.

9. The computing device of claim 7, wherein the data file is received from the source computing device via a second network.

10. The computing device of claim 7, wherein the selecting and initiating is repeated after each expiration of a predetermined time period.

11. The computing device of claim 7, wherein in response to receiving a request for the data file from a requesting computing device, the processor initiates transmission of the data file from the computing device of the network that then stores the data file to the requesting computing device.

12. The computing device of claim 11, wherein the requesting computing device comprises the source computing device.

13. The computing device of claim 11, further comprising:
receiving an indication of one or more users that are authorized to receive the data file, wherein the requesting computing device is operated by one of the authorized users.

14. The computing device of claim 7, wherein physical storage devices include hard disks, magnetic disks, magneto optical disks, and optical disks.

15. The computing device of claim 7, wherein the computer memories of the computing devices each comprise one or more of a read only memory and a random access memory.

16. The computing device of claim 7, wherein the at least one processor is further configured to:
receive an indication that a new computing device has been coupled to the network of computing devices and, in response to receiving the indication, to select the new computing device for storage of the data file in a computer memory of the new computing device.

17. A computer readable medium having stored thereon a computer program that, if executed by a computer system, causes the computer system to perform a data storage method that comprises:

receiving a request from a source computing device to store a data file;

selecting a computing device of a plurality of computing devices in communication via one or more networks to store the data file in a computer memory of the selected computing device;

initiating transmission of the data file to the selected computing device, wherein the data file is stored on the computer memory of the selected computing device and not on a physical storage device of the selected computing device; and periodically repeating the selecting and initiating so that the data file is periodically transmitted between computer memories of the computing devices without being stored on a physical storage device of the plurality of computing devices.

18. The computer readable medium of claim 17, wherein the selecting of a computing device is at least partly based on a network traffic analysis and available memory of at least some of the computing devices.

19. The computer readable medium of claim 17, wherein the method further comprises:
encrypting the data file prior to transmitting of the data file to the selected computing device so that only the selected computing device is configured to decrypt the encrypted data file.

20. The computer readable medium of claim 17, wherein physical storage devices include hard disks, magnetic disks, magneto optical disks, and optical disks.

21. The computer readable medium of claim 17, wherein the computer memories of the computing devices each comprise one or more of a read only memory and a random access memory.

* * * * *

UNITED STATES PATENT AND TRADEMARK OFFICE
CERTIFICATE OF CORRECTION

PATENT NO. : 7,844,695 B2
APPLICATION NO. : 12/240802
DATED : November 30, 2010
INVENTOR(S) : Fein et al.

Page 1 of 1

It is certified that error appears in the above-identified patent and that said Letters Patent is hereby corrected as shown below:

Title Page 2, item (56), under "Other Publications", in Column 2, Line 7, delete "(MANETS)," and insert -- (MANETs), --.

Column 1, Line 7, delete "2008" and insert -- 2008, --.

Signed and Sealed this
Seventeenth Day of May, 2011

David J. Kappos
*Director of the United States Patent and Trademark Office*